> United States Patent Office 3,788,886
Patented Jan. 29, 1974

3,788,886
METHOD FOR PRODUCING AN OPAQUE COATING
Ehrlich M. Eiland, Lower Burrell, Pa., assignor to Aluminum Company of America, Pittsburgh, Pa.
No Drawing. Continuation of abandoned application Ser. No. 781,977, Dec. 6, 1968. This application Aug. 10, 1971, Ser. No. 170,647
Int. Cl. B32b 15/08; B44d 5/06
U.S. Cl. 117—132 BF          4 Claims

ABSTRACT OF THE DISCLOSURE

A process for producing an opaque coating on a substrate comprising applying to said substrate a composition comprising mineral spirits or Stoddard solvent, cellulose acetate butyrate or cellulose acetate propionate having an hydroxyl content of about 4.5%, a urea-formaldehyde or melamine polymer, a cross-linking catalyst, a plasticizer, and a lacquer solvent and curing said composition on said substrate by heating.

---

This is a streamlined continuation of Ser. No. 781,977, filed Dec. 6, 1968 and now abandoned.

BACKGROUND OF THE INVENTION

This invention relates to a coating composition. More particularly, it relates to preparation of a lacquer which when applied to a substrate such as wood, metal or the like produces a white opaque coating thereon.

Resin lacquer coatings prepared by use of a portion of the solvent which is compatible with but not completely soluble in the remainder are known. For example, Coney et al. U.S. Pats. 2,875,164, 3,265,645 and 3,282,716 teach employment of a multi-component solvent and involve cellulose ester/urea formaldehyde lacquers which, when applied to a substrate may be cured thereon by cross-linking to a clear, high-gloss film. It is also known to add pigments to such lacquers to obtain white rather than clear coatings. Such pigments, however, are relatively expensive, and to obtain the desired degree of whiteness usually 8–10 pounds of lacquer are required to coat a ream of 3,000 square feet. Therefore, development of a coating which permits use of lesser amounts thereof than do prior art coatings and which does not require use of pigments to produce opacity, particularly an opacity or whiteness of the degree desired for use on a substrate such as the aluminum foil conventionally used in packaging mints, chewing gum and the like, represents a highly desirable result. By aluminum I mean aluminum and alloys thereof containing at least 50% by weight aluminum.

It is accordingly an object of this invention to provide a coating composition which is basically non-pigmented but which is white or becomes white when applied to an aluminum or like substrate and cured either at room temperature or at an elevated temperature. Another object of this invention is to provide a method for producing an opaque white coating which does not require use of white pigments. A further object of this invention is to provide a substrate coated with a white-colored laquer. Further objects will be apparent from the description and claims which follow.

SUMMARY OF THE INVENTION

In its broader aspects my invention involves mixing a cross-linking catalyst and an organic liquid comprising at least 85% by volume paraffinic hydrocarbons, such as mineral spirits or the like, said liquid having a boiling point of at least about 300° F., with a lacquer in which is dissolved a cross-linkable resin and a cross-linking agent.

I will refer to the added organic liquid mixed with the lacquer as the non-solvent, diluent or dispersing phase since it is not a solvent for the lacquer solvent or the cross-linkable resin and cross-linking agent contained therein. As mentioned hereinabove, it must have a boiling point of at least about 300° F. Preferably its boiling point is above 325° F., and most desirably above 350° F. It may contain up to 5% olefins and up to 14% aromatics.

This organic liquid higher-boiling non-solvent, or diluent, is a material which the lacquer (active) solvent and lacquer solids will tolerate without any substantial precipitation thereof. Also, this organic liquid, non-solvent or diluent used as the dispersing phase according to my invention, by taking longer to evaporate due to its higher boiling point, gives time for the desired opacity to develop. Organic liquids useful according to my invention as this non-solvent ingredient are, for example, odorless naphtha or Stoddard solvents, mineral spirits, and mineral oils which have the required boiling point and paraffinic hydrocarbon content. Illustrative higher-boiling liquids useful according to my invention are Sohio 3440, Sohio 3454, Shell Oil Company mineral spirits, Sohio Stoddard Solvent 3039 and Sohio Solvent 140. Atlantic Refining Company Atreol 21 mineral oil was also found to be useful in developing the desired opaque white coating. Preferred amount of this non-solvent is from about 12% to about 40% by weight.

The cross-linkable resin may be a cellulose ester, such as cellulose acetate propionate and cellulose acetate butyrate or an alkyd resin, such as those obtained by condensing and polymerizing phthalic anhydric anhydride or other dicarboxylic acid with a polyhydroxy alcohol such as glycerol, modified by fatty acids, drying oils such as linseed, or the like, if desired. Representative cellulose esters useful according to my invention include the propionic and butyric acid esters of cellulose. Particularly useful are those which are soluble in alcohols, e.g., ethyl alcohol, which is a convenient lacquer (active) solvent according to my invention. A representative cellulose acetate butyrate which I have found suitable according to my invention has a butyryl range of about 35 to 50%, a 1–10% hydroxyl content and a viscosity range of from about 0.1 to 40 seconds. Typical cellulose esters useful in my invention include those ordinarily referred to as half-second cellulose acetate butyrates and half-second cellulose acetate propionates and those commonly called alcohol-soluble butyrates and propionates. A typical useful cellulose acetate propionate might have a propionyl content of from about 40 to 55% and a viscosity of from about 0.1 to 50 seconds. Preferred acetyl content for the cellulose esters useful according to my invention is 1–10%.

The cross-linking agent is a compound with which the resin will cross link to form a cured coating. It must be compatible with the cross-linkable resin. Preferred is a condensation polymer. The condensation polymer may be one formed by condensation of a urea-type compound such as urea, thiourea, cyanamide, guanidine, melamine or the like with a lower aliphatic aldehyde (usually an aldehyde containing from 1 to 4 carbon atoms, and most commonly formaldehyde), or with such an aldehyde and an alcohol, for example, butanol. For example, the urea formaldehyde polymers of the above-mentioned Coney et al. patents may be used as the condensation polymer.

For example, the specific urea formaldehyde polymer may be dimethylol urea. The urea formaldehyde polymer may be alkylated, for example, such as the butylated urea formaldehyde of above-mentioned Coney et al. U.S. Pat. 3,265,645. Representative urea formaldehyde resins include American Cyanamide Beetle 216–8 supplied at 60% solids in butanol/xylol, Beetle XB–1047 supplied at 55% solids in isobutanol/xylene and Reichold Chemicals Beckamine P–196–60, an alcohol-soluble urea resin furnished at 60% solids. Representative melamine polymers which I have found useful according to my invention include American Cyanamid Cymel 300 and Cymel 301, hexamethoxymethyl melamine resins. Such condensation polymers may be incorporated in the lacquer in unpolymerized, polymerized or partially polymerized form. For convenience I will refer to such a condensation polymer as a urea-formaldehyde or melamine polymer.

When applied to a substrate, for example, wood or aluminum, my lacquer may be cured by air drying or heating to an elevated temperature to accomplish curing by cross-linking of the resin with the cross-linking agent and resultant production of an opaque white coating. The cross-linking agent reacts with reactive groups of the cross-linkable resin, for example, the hydroxy groups of cellulose acetate butyrate or cellulose acetate propionate when the cross-linkable resin used is a cellulose ester. It is believed that curing takes place by evaporation first of the lacquer (active) solvent, that is, the solvent in which the cross-linkable resin and the cross-linking agent are dissolved, which may be called the dispersion phase. At this point the coating appears practically clear and in an initial state of cure wherein some rigidity is possessed but not the hardness of a fully cured lacquer. Then the coating cures completely to a white opaque color upon evaporation of the non-solvent, or diluent, which has a higher boiling point, that is, the above-defined paraffinic hydrocarbon having a boiling point of at least about 300° F. It appears that the non-solvent is dispersed in the lacquer film as minute particles 0.2–1.5 microns in size (diameter) and when the higher-boiling non-solvent is driven off from the partially cured lacquer film, this leaves spherical voids of the same 0.2–1.5 micron size with resultant light scattering at the air-lacquer solids interfaces producing the white-colored opacity.

Preferred concentration of cross-linkable resin and of cross-linking agent is from about 3.3 to about 20% by weight of the resin lacquer without higher-boiling non-solvent and from about 2 to about 20% by weight of the coating composition with higher-boiling non-solvent.

The solvent for the resin/cross-linking agent lacquer or dispersion phase of my invention I designate as an alcohol-type solvent as ethyl alcohol is a representative solvent, although this solvent may contain one or more additional similar substances, such as ketones and organic esters, which it is believed help to lessen the gradual increase in viscosity which generally takes place after the composition is made up. The lacquer solvent may contain a high percentage of a lower aliphatic alcohol, for example, the aforementioned ethyl alcohol. Representative components of the lacquer solvent, which may also be called the active solvent, that is, the lower-boiling solvent of the dispersion phase, are methyl ethyl ketone, methyl isobutyl ketone, acetone, ethyl cellusolve, ethyl alcohol, isopropanol, ethyl acetate, n-propyl alcohol, n-butyl alcohol and the like. Mixtures of two or more of the foregoing may be used. For example, any of the solvents or mixtures of solvents for the cross-linkable resin/cross-linking agent may be the predominantly non-aqueous solvents used in above-mentioned Coney et al. U.S. Pats. 2,875,164, 3,282,716 and 3,265,645. The active or lacquer solvent (lower-boiling solvent) preferably has a boiling point of less than about 275° F. Preferred concentration of this lower-boiling or active solvent for the cross-linkable resin and cross-linking agent is from about 6 to about 60% of the coating composition of my invention including the higher-boiling non-solvent.

The preferred weight ratio for the amount of higher-boiling organic liquid or diluent to solids content of the lacquer containing the cross-linkable resin and the cross-linking agent is from about 0.75:1 to about 1.75:1.

A cross-linking catalyst is essential for forming the desired amount of white color or opacity developed upon curing, that is, in cross-linking the resin with the cross-linking agent. Usually an acid catalyst is used. Representative acid catalysts which may be used according to my invention include the preferred catalysts p-toluene sulfonic acid and metane sulfonic acid and sulfuric acid, plus other alkane sulfonic acids, hydrochloric acid, nitric acid, and the like. Other acid catalysts which may be useful include those of Coney et al. U.S. Pat. 3,282,716 Referred to above, specifically, methyl, ethyl or propyl sulfonic acids, or a mixed alkane sulfonic acid such as described in U.S. Pat. 2,875,164. Preferred amount of catalyst useful according to my invention is from about 0.035 to about 1.7% by wight of the lacquer without the higher-boiling solvent (this percent not including the butyl alcohol or other diluting solvent for the catalyst to give, for example, a 25% solution of catalyst such as sometimes useful) and from about 0.025 to about 2% by weight of the lacquer with higher-boiling point solvent added thereto. Aging the catalyst, for example, by boiling for two hours and then storing at room temperature for a week or two, tends to result in a somewhat more stable coating composition and to prevent premature curing or failure to form the desired amount of white color or opacity.

Conventional plasticizers which may be used in the coating composition of this invention, preferably in amounts up to about 4% by weight of the total composition containing the higher-boiling liquid or diluent, include the preferred triphenyl phosphate and 2-ethyl hexyl diphenyl phosphate, plus chlorinated biphenyl, chlorinated triphenyls, dioctyl phthalate, and the like. Blends of plasticizers may be used, for example, a blend of dioctyl phthalate with a more active plasticizer.

According to my invention there may be used up to about 10% of one or more modifying resins based upon the weight of the coating composition including the diluent. For example, one or more of the following may be used to modify viscosity and improve final toughness and water resistance of the lacquer when coated and cured on a substrate: epoxy resins such as Shell Epon 836, Epon 828 and Epon 1004, which are epichlohydrin-bisphenol A type polymers ranging from liquid to solid resins and ranging in epoxide values from about 180 to about 1025; phenolic resins such as General Electric Methylon 75108, and polyvinyl butyral resins such as Union Carbide XYHL, and the like.

If it is desired to add color to the opaque coating formed by curing of the coating composition according to my invention or to produce an even higher degree of whiteness, dyes and pigments may be added in amounts up to about 12% by weight. Slip agents such as talc, mineral oil, dimethyl silicone polymers, and graphite may also be added in similar amounts to reduce the coefficient of friction of the surface of the particular substrate coated with the cured coating composition according to my invention.

Small amounts of other conventional additives such as antioxidants may also be used in the coating composition of my invention provided they are compatible with the other ingredients and not reactive in such a way as to destroy the desired opaque white color when it is coated on a substrate.

According to my invention the dispersing phase, that is, the higher-boiling organic liquid, diluent or non-solvent, should be added to the mixture last, preferably just after the addition of the catalyst. It should be mixed with the remaining ingredients sufficiently to cause the desired droplets to form. If a clear dispersion does not result at first, continued mixing will produce one. That is, there should be enough mixing by stirring, shaking, or the like to disperse any gel which may be formed and to form an almost clear solution.

It is preferred in preparing the coating composition, prior to spreading it on the substrate and curing it by cross-linking, that the cross-linking agent be added to the lacquer just before addition of the catalyst and the higher-boiling solvent, which, as just explained, are added last. This will help to prevent premature curing.

If the required cross-linking of the resin with the cross-linking agent is obtained by air curing, usually about 24 to 96 hours are required after application to substrate to obtain a satisfactory degree of whiteness or opacity. When curing is accomplished by heating, a temperature of about 250° F. to 750° F. is preferred. Best development of opacity is at 650–750° F. for from 1–60 seconds.

The coating may be applied by spraying, rolling, brushing or the like. One way is to use a gravure roll and a web containing the coated substrate run at 200–300 ft./min. directly into an oven at 400–750° F. In such a procedure the several steps involved in producing the desired opaque coating are accomplished in rapid succession. First, the active solvent is driven off, then the non-solvent or diluent droplets become distributed in the lacquer, with the resin cross-linking with the cross-linking agent and becoming semi-rigid to rigid, and finally the higher boiling non-solvent being driven from its entrapped globular form to leave minute voids which develop the desired whiteness or opacity.

The amount of lacquer applied, when used on foil, is usually about 0.5 to 5 lbs./3,000 sq. ft., preferably 1–3 lbs./3,000 sq. ft., that is, a sufficient amount to result in a coating thickness of about 1/10 to 1/2 mil or .00001 to .0005 inch.

The following examples are illustrative of the invention.

Example 1

A formulation containing 31% non-volatile material was made as follows:

| Material: | Weight, grams |
|---|---|
| Alcohol soluble butyrate | 13.5 |
| Urea formaldehyde in ethyl alcohol | 22.5 |
| Dioctyl phthalate | 3.0 |
| Anhydrous ethyl alcohol | 60.0 |
| p-Toluene sulfonic acid | 1.0 |

The butyrate used was ethyl alcohol-soluble, and the sole lacquer solvent in this example was ethyl alcohol. Curing was effected by reaction of urea formaldehyde with hydroxy groups of the butyrate.

Thirty-one grams of odorless mineral spirits were added to 100 grams of the above lacquer in a bottle. The bottle was then shaken for about 30 minutes on a paint shaker to disperse the mineral spirits in the lacquer. The lacquer was then applied at about two pounds of dry lacquer solids per 3,000 sq. ft. on 1145–0 aluminum foil of about .002 inch in thickness. On drying with a small hand dryer to remove alcohol, an almost transparent coating with very little tackiness was first formed. The coated foil was then placed in a forced-draft oven at 400° F. for 15 seconds to drive off the mineral spirits and complete the cross-linking cure. A highly opaque white coating was produced.

Thin layers of this coating when viewed at 700× magnification with transmitted light showed very small, tightly packed spheres or bubbles. In an electron microscope at 20,000× and 50,000× the bubbles appeared to be almost perfect spheres. The spheres appeared to be in the approximate range of 0.2 to 1.5 microns in diameter. Electron micrographs were made.

The white coating had good adhesion to annealed foil and fair adhesion even after water immersion. It also showed good scuff resistance and did not lose whiteness on applying an over-print lacquer. It did not blacken or lose whiteness when placed in a heat sealer at 280° F. and 30 p.s.i. for 1 second.

Example 2

The following formulation was made and coated on annealed foil, the foil used being toluene-cleaned and consisting of 3003–H19 aluminum alloy:

Part A

| Material: | Pounds |
|---|---|
| Alcohol soluble butyrate | 6.82 |
| Triphenyl phosphate (plasticizer) | 1.50 |
| Twenty percent solution of epoxy resin | 6.00 |
| Phenolic resin | 1.50 |
| Solvent [ in parts, 25 MEK (methyl ethyl ketone), 46.2 isopropanol, 28.8 ethyl acetate | 30.30 |
| Odorless mineral spirits | 22.0 |

Part B 11.36 lbs. 60% urea formaldehyde resin and .20 lb. paratoluene sulfonic acid were added to Part A.

This composition was applied to annealed foil, toluene-cleaned 3003–H19 foil, .009" 3105 toluene-cleaned aluminum sheet, primed .009" 3105 aluminum sheet and aluminum sheet and primed foil. It adhered well in all cases and withstood pasteurization in hot water. It also gave good adhesion to metal decorating inks, and over-print lacquer satisfactorily took an overbake and withstood forming.

EXAMPLE 3

The following formulation was made up and applied to aluminum foil. The butyrate and epoxy resin solutions were mixed separately and allowed to cool to room temperature before use. The B part was added and mixed with the lacquer just before use, the mineral spirits being added last. Addition of the mineral spirits caused a gel formation which was dispersed to form an almost clear solution upon further mixing. The resulting lacquer contained 20.7% solids. Viscosity of the freshly made solution was 23 seconds, No. 2 Zahn cup. The viscosity increased to about 40 seconds over three days. The lacquer was applied on an Inta Roto machine with a 65 line helix roll and a smoother bar to give 2.5 lbs./3,000 sq. ft. on .0035" 1145–0 aluminum foil. The temperature was raised to about 400° F. to develop the desired whiteness. The same composition was also applied at the rate of 1.4 lbs./3,000 sq. ft. Application was similar except that no smoother bar was used.

"A" solution

| | Pounds |
|---|---|
| Alcohol-soluble butyrate | 6.81 |
| Solvent (25.2% MEK+28.8% ethyl acetate +46.0% isopropyl alcohol, by wt.) | 28.99 |
| N-propyl alcohol | 3.75 |
| Epoxy resin, solution 20% in solvent (25.5% MEK+28.8% ethyl acetate+46.0% isopropyl alcohol, by wt.) | 6.87 |
| Phenolic resin | 1.72 |
| Santicizer 141 plasticizer | 1.72 |

"B" materials

The "B" materials were added to the "A" solution just before using on the coating machine.

| | |
|---|---|
| Urea-formaldehyde | 13.02 |
| Solvent (25.2% MEK+28.8% ethyl acetate +46.0% isopropyl alcohol, by wt.) | 8.02 |
| p-Toluene sulfonic acid solution (25% in n-butyl alcohol) (this solution was boiled two hours before use) | .92 |
| Odorless mineral spirits | 25.20 |

EXAMPLE 4

A coating composition substantially the same as that of Example 3 was prepared except that only 0.8 gram of catalyst and 22.0 grams of mineral spirits (Sohio 3440) were used. Upon evaporation at the higher-boiling temperature required to evaporate the mineral spirits, the small spheres of mineral spirits which were trapped within the lacquer composition were driven off to leave small spherical voids. A white opacity resulted. Sohio 3454 hydrocarbon liquid was then used in place of Sohio 3440 as the higher-boiling non-solvent. Both of these liquids have an initial boiling point above 350° F., and both are straight aliphatic materials with no aromatics. The KB value for both is around 26 or 27. Other higher-boiling non-solvents were also tried, including Shell Oil mineral spirits with a boiling range of 324 to 398° F. and an aromatic content of 16%, Sohio Stoddard solvent 3039 and Sohio solvent 140, with boiling ranges similar to the Shell mineral spirits. Atlantic Refining Company Atreol 21 mineral oil was also used with a somewhat lesser degree of whiteness resulting.

EXAMPLE 5

To determine amounts of higher-boiling organic liquid which will give the desired whiteness, various amounts of Sohio 3440 mineral spirits were added to a composition substantially the same as that of Example 4 except for the amount of mineral spirits. The mineral spirits were used with 65.28 grams of solution. The following table shows the degree of whiteness produced after coating and curing.

TABLE

| Appearance, coating whiteness: | Mineral spirits (g). |
| --- | --- |
| Small amount of whiteness | 8 |
| Fair white, 10% of coated area | 12 |
| Fair white, 30% of coated area | 14 |
| Fair white, 75% of coated area | 16 |
| Good white, 95% of coated area | 18 |
| Good white, 100% of coated area | 24 |
| Good white, 100% of coated area | 28 |
| Good white | 32 |
| Fair white | 36 |
| Do | 40 |
| Low whiteness | 44 |
| Gel formed | 46 |

EXAMPLE 6

A lacquer of the following composition gave good whiteness when applied to aluminum foil and cured thereon.

| | Weight percent |
| --- | --- |
| Butyric acid ester of cellulose | 10.44 |
| Epoxy resin | 1.83 |
| Phenolic resin | 2.30 |
| Plasticizer | 2.30 |
| Urea-formaldehyde resin | 10.44 |
| Catalyst | .31 |
| Solvent | 72.38 |
| (27.6% solids) | 100.00 |

Mineral spirits (ratio of mineral spirits to solids= 1.35:1)—37.3*

*37.3 grams of mineral spirits added to 100 grams of preceding lacquer.

The butyrate ester of cellulose, which contained about 1.6% acetyl and about 4.5% hydroxy, was dissolved in solvent. Use of a high speed mixer results in a rise in temperature. The solution was allowed to cool. Then the epoxy resin was added as a 20% by weight solution. Then the phenolic resin and plasticizer were added. Then the urea-formaldehyde resin was added. Just prior to use, the catalyst, 25% p-toluene sulfonic acid in butanol, and mineral spirits were added. When the mineral spirits were added, some gelling occurred. This was caused in the area of liquid where the mineral spirits were poured into the solution. On mixing for a short time with an ordinary propeller type mixer the gel disappeared once the active resin solvent was thoroughly mixed with the mineral spirits, and a clear solution resulted.

The viscosity of the solution at the beginning was 23 seconds on a No. 2 Zahn cup and rose to about 27 seconds in eight hours.

This solution may be applied by means of a coating bar, by roto-gravure or by other methods to aluminum foil or other substrates. Air drying results in a white coating. Somewhat better film properties may be obtained when curing is done at higher temperatures. A tough solvent resistance and water resistant high opacity film is obtained when the coating is applied to .002"-thick annealed aluminum foil and then dried at 450° F. for 15 seconds in a force-draft oven.

Example 7

10.8 grams of a 10% solution of Geigy Chemical Corp. Irgacet Scarlet GL dye were added to 100 grams of the solution of Example 6 to produce an opaque scarlet color. The Irgacet dyes are solvent-soluble hydroxyazo metal complexes.

Example 8

7.7 grams of a 10% solution of Ciba Chemical and Dye Co. Solvent-Soluble Red 2B dye were added to 100 grams of the solution of Example 6 to give an opaque red color. This dye is also a metal complex of azo compounds.

Example 9

10.8 grams of Interchemical Corp. Molybdate Orange No. 2613 expoxy pigment dispersion were added to 100 grams of the solution of Example 6 to give an opaque orange color. No. 2613 orange consists of molybdate orange dispersed in an epoxy resin with solvents. The composition is 65% pigment+15% epoxy resin 1001+15% butyl alcohol+15% toluol.

Example 10

2.8 grams of Interchemical Corp. Midas Gold No. 9604 butyrate chips were added to 100 grams of the solution of Example 6. When the coating composition was applied to foil and dried an opaque yellow coating resulted. When used in coatings that produce transparent films this gold pigment dispersion produces a transparent gold color.

Midas Gold No. 9604 contains 45% iron oxide pigment, 45% cellulose acetate butyrate resin and 15% plasticizer.

While the invention has been described in terms of preferred embodiments, the claims appended hereto are intended to encompass all embodiments which fall within the spirit of the invention.

Having thus described my invention and certain preferred embodiments thereof, I claim:

1. A process for production of an opaque coating on an aluminum substrate which comprises
    (1) mixing mineral spirits or a Stoddard solvent with a lacquer comprising as essential ingredients cellulose acetate butyrate or cellulose acetate propionate having an hydroxyl content of about 4.5%, a urea-formaldehyde or melamine polymer, a p-toluene sulfonic acid, methane sulfonic acid or sulfuric acid cross-linking catalyst and a plasticizer, and a lacquer solvent having a boiling point less than about 275° F., thereby forming globules of said mineral spirits or Stoddard solvent in the resulting mixture, said globules averaging from about 0.2 to about 1.5 microns in size,
    (2) applying said mixture to an aluminum substrate, and
    (3) curing said mixture on said aluminum substrate by application of sufficient heat to cross-link said cellulose acetate butyrate or cellulose acetate propionate with said urea-formaldehyde or melamine polymer and form a film containing voids averaging from about 0.2 to about 1.5 microns in size and developed by evaporation first of the lacquer solvent and then of the Stoddard solvent or mineral spirits, thereby obtaining an opaque color caused by light scattering at the resulting air-mixture solids interfaces.

2. A process for production of an opaque coating on a substrate which comprises
   (1) dispersing an organic liquid comprising at least 85% by volume paraffinic hydrocarbons and having a boiling point of at least about 300° F. in a lacquer comprising as essential ingredients at least one cross-linkable resin comprising cellulose acetate propionate or cellulose acetate butyrate having an hydroxyl content of about 4.5%, a cross-linking agent compatible with said resin, a solvent for said resin and said cross-linking agent, and an acid catalyst adapted for promoting cross-linking of said resin with said cross-linking agent, said boiling point being higher than the boiling point of said solvent, thereby forming a substantially clear dispersion of droplets of said organic liquid,
   (2) applying said lacquer to said substrate, and
   (3) heating said lacquer applied to said substrate sufficiently to first drive off said solvent and partially cure said lacquer on said substrate and thereafter drive off said organic liquid, with reaction between said resin and said cross-linking agent, thereby replacing said droplets with voids without any substantial precipitation of said lacquer, said voids scattering light sufficiently to form an opaque coating in the absence of pigment or dye.

3. The process of claim 2 wherein the heating is conducted in a high-temperature oven at 400–750° F.

4. An improved process for producing opaque coatings which comprises
   (1) applying to a substrate a resin dispersion comprising as essential ingredients at least one cross-linkable resin comprising cellulose acetate butyrate or cellulose acetate propionate having an hydroxyl content of about 4.5%, a cross-linking agent compatible with said resin, a solvent for said resin and said cross-linking agent, as a non-solvent an organic liquid comprising at least 85% by volume paraffinic hydrocarbons and having a boiling point of at least about 300° F., and a catalyst selected from the group consisting of p-toluene sulfonic acid, methane sulfonic acid, sulfuric acid, an alkane sulfonic acid, hydrochloric acid and nitric acid, and
   (2) heating the substrate with the dispersion applied thereto at 250° F. to 750° F. for 1–60 seconds, thereby first driving off said solvent and entrapping droplets of said non-solvent in the dispersion, said cross-linking resin thereupon cross-linking with said cross-linking agent and the dispersion becoming semi-rigid, and thereafter driving off the non-solvent from its entrapped globular form to leave minute voids which create an opacity.

References Cited

UNITED STATES PATENTS

| | | | |
|---|---|---|---|
| 3,020,172 | 2/1962 | Mohnhaupt | 117—36.7 |
| 3,031,328 | 4/1962 | Larsen | 117—36.7 |
| 3,037,963 | 6/1962 | Christenson | 260—72 |
| 3,118,853 | 1/1964 | Hart et al. | 260—834 X |
| 3,108,009 | 10/1963 | Clancy et al. | 117—46 |
| 2,970,070 | 1/1961 | Lashua et al. | 117—132 |
| 2,739,909 | 3/1956 | Rosenthal | 117—161 |
| 2,259,746 | 10/1941 | Goff | 106—179 X |
| 3,265,645 | 8/1966 | Coney et al. | 260—15 |
| 2,875,164 | 2/1959 | Ball et al. | 260—15 |
| 3,419,515 | 12/1968 | Schmidle et al. | 260—33.6 X |
| 3,655,591 | 4/1972 | Seiner | 117—36.7 X |

FOREIGN PATENTS

| | | | |
|---|---|---|---|
| 715,517 | 8/1965 | Canada | 117—36.7 |

WILLIAM D. MARTIN, Primary Examiner

H. J. GWINNELL, Assistant Examiner

U.S. Cl. X.R.

117—159, 161 C, 166